United States Patent Office 3,567,651
Patented Mar. 2, 1971

3,567,651
DYE PENETRANT FOR SURFACES SUBSEQUENTLY CONTACTED BY LIQUID OXYGEN
Ralph M. F. Giles, La Mirada, and Isidore Pollack, Westminster, Calif., assignors to the United States of America as represented by the Administrator of the National Aeronautics and Space Administration
No Drawing. Filed Feb. 3, 1965, Ser. No. 430,192
Int. Cl. C09k 1/02; G01n 21/16, 21/38
U.S. Cl. 252—301.2                          1 Claim

ABSTRACT OF THE DISCLOSURE

A dye penetrant inspection material and technique are described for nondestructive testing of solid surfaces that may be contacted by liquid oxygen. The dye penetrant solution comprises a trifluorochloroethylene polymer having a degree of polymerization in the range of from 2 to 10 in a quantity sufficient to suppress violent reaction of the solution with liquid oxygen, a halogenated solvent having an evaporation rate not greater than the evaporation rate of methylene chloride and miscible with said polymer, plus a dye soluble in said polymer and said solvent, the quantity of said dye being not greater than 1:20 relative to said polymer so that the solution is substantially insensitive to reaction to strongly oxidizing materials.

---

The invention described herein was made in the performance of work under a NASA contract and is subject to the provisions of the National Aeronautics and Space Act of 1958, Public Law 85–568 (72 Stat. 426; 42 U.S.C. 2451) as amended.

In the fabrication of vessels and handling equipment for liquid oxygen and other strongly oxidizing materials it is often desirable to inspect weldments and other parts for minute cracks. An accepted industrial technique for detection of cracks involves the use of a penetrating liquid containing a dye. This material is applied to a solid surface to be inspected and if any cracks exist, some of the liquid is drawn into the cracks by capillary action. After allowing a sufficient time for penetration the excess liquid is rinsed or wiped from the surface. A powdery developer is then applied to the surface of the piece to be inspected and liquid containing the dye is drawn from any existing cracks to wet the large amount of surface on the powdery developer. Visual examination of the surface readily detects the presence of the dye in the background of developer thereby indicating the presence of any cracks that extend to the surface inspected. A particularly sensitive dye penetrant inspection technique employs fluorescent dyes which are observed under ultraviolet illumination.

A difficulty with the conventional dye penetrant inspection techniques is encountered in parts which may subsequently be contacted by liquid oxygen. It is found that very small concentrations of organic materials and the like combine with the highly oxidizing liquid oxygen in a rapid and possibly catastrophic manner. For this reason conventional dye penetrant materials that contain conventional organic materials are unacceptable for surfaces that may be wetted by liquid oxygen. Accidently remaining residues of these penetrants may react violently with liquid oxygen or other strongly oxidizing materials.

It is therefore a broad object of this invention to provide a dye penetrant material that is acceptable for use on surfaces that may be wetted by liquid oxygen.

Thus in the practice of this invention according to a preferred embodiment there is provided a dye penetrant solution comprising a trifluorochloroethylene polymer having a degree of polymerization in the range of from two to ten, a halogenated solvent miscible with said polymer and a dye soluble in said polymer and said solvent.

Thus it is a broad object of this invention to provide a new dye penetrant material.

It is another object of this invention to provide a nondestructive testing technique.

Other objects and many of the attendant advantages of this invention will be readily appreciated as the same becomes better understood by reference to the following detailed description.

The stability of chemical compounds is directly related to the strength of the bond between the atoms of the compound. Strong bonds are formed between atoms that differ greatly in electronegativity, conversely, weaker bonds have smaller electronegativity differences. Thus compounds having atoms which have a high electronegativity are relatively stable and also tend to react vigorously on formation. The electronegativity of atoms is attributed to their affinity for electrons. Those which have a high affinity for electrons have high electronegativity values and high heats of formation when forming compounds. This results in a very high degree of stability. The accepted relative electronegativity value for fluorine is 4.0 and the accepted value for oxygen is 3.5. Consequently fluorine and oxygen should exhibit a comparable degree of stability when bound in a compound. Chlorine has an electronegativity value of 3.0 which yields compounds which are highly stable but somewhat less stable than their fluorine counterparts.

It is therefore desirable to formulate a dye penetrant material from organic compounds having a high degree of fluorination. It is found, however, that dye materials having a high degree of halogenation and a vivid appearance are not available. The available dyes are all highly reactive with liquid oxygen. Similarly the conventional solvents for dyes employed in dye penetrant inspection are also highly reactive with liquid oxygen. Similar reactivity is found with other strongly oxidizing materials such as $N_2O_4$ and the like.

It has been found in the practice of this invention that the use of the highly fluorinated class of trifluorochloroethylene polymers as a solvent or vehicle for dye prevents reaction between liquid oxygen and dye materials that normally would react violently with liquid oxygen. The mechanism of inactivation of dyes by the trifluorochloroethylene polymer is not fully understood, however, it is hypothesized that the diluted dyes are dispersed to a degree that limits the ability of any reaction with liquid oxygen to be self-sustaining in the presence of the substantially inert fluorinated polymer.

The trifluorochloroethylene polymers preferred in the practice of this invention comprise a carbon chain having the structure

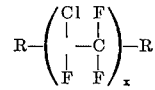

where X is from 2 to 10 and R is selected from the class consisting of hydrogen and halogens. The most stable polymers have fluorine as the terminal material R, however, it is found that terminal members of hydrogen or other halogens are sufficiently stable and have no reaction with liquid oxygen. Polymers having less than four carbon atoms in the chain are not liquids suitable for use in the practice of this invention. Polymers having a degree of polymerization higher than about 10 have a viscosity higher than is suitable for a dye penetrant vehicle for the penetration of very small cracks. The best sensitivity is found with polymers having a degree of polymerization less than 10. The polymers preferred are addition polymers of trifluorovinyl chloride and are available under the trademark KEL-F from the Minnesota Mining and Manufacturing Co., St. Paul, Minn., under the trademark Fluorolube from the Hooker Chemical Corp., Niagara Falls, N.Y., from Halocarbon Products Co., Hackensack, N.J., and from several other suppliers of halogenated hydrocarbons.

Trifluorochloroethylene polymers are non-flammable oil like materials having a high stability due to the high electronegativity of the halogen, particularly the fluorine. Tests of the compatibility of trifluorochloroethylene polymers with liquid oxygen under impact conditions at 72 foot-pounds as described hereinafter has indicated that no reactions occur.

In order to enhance the visibility of a penetrant, organic dyes are added to the trifluorochloroethylene polymer vehicle. These dyes provide a visible indicator with a high contrast with the surrounding surface. Thus, for example, in many dye penetrant inspection techniques, the surface of the part to be inspected is coated with powdered white talc in order to draw the penetrant from minute cracks. In a system of this sort it is desirable to employ a dye having a high color for maximum contrast with the white background. A dye that is particularly useful because of the intense red color is a diazo type dye having the structure

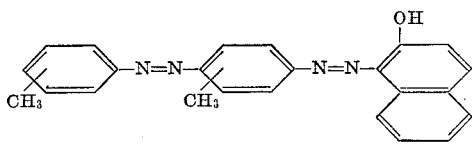

available under the trademark Oil Red O from Allied Chemical Corp., National Aniline Div., New York, N.Y., and under other names from other suppliers.

Similarly it is often desirable in order to obtain a high degree of sensitivity for the detection of small cracks to employ dye that fluoresces under excitation by ultraviolet light. Particularly useful fluorescent dyes include a coumarin type dye, 4-methyl-7-diethyl amino coumarin, having the structure

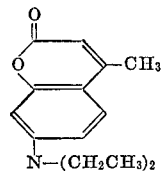

available under the trademark Calcofluor White RW from American Cyanamid Co., New York, N.Y., and a naphthalimide type dye having the structure

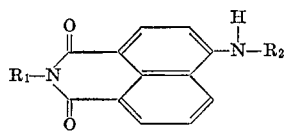

where $R_1$ and $R_2$ are each carbon groups having from 4 to 12 carbon atoms and wherein $R_1$ is different from $R_2$. Such a material is available under the trademark Fluorol 7–GA from General Aniline and Film Corp., New York, N.Y. It is preferred in the practice of this invention to employ dyes such as Calcofluor White RW and Fluorol 7–GA in combination to provide an optimum color range for visual sensitivity and a maximum fluorescent intensity. When employing both Fluorol 7–GA and Calcofluor White RW as fluorescent dyes it is preferred that the ratio of Flourol 7–GA to Calcofluor White RW be in the range of from about 1:1 to 5:1 for optimum fluorescent intensity and color.

It is found in preparing dye penetrants employing dyes of the type recited above in trifluorochloroethylene polymer that the solubility of the dyes in the trifluorochloroethylene polymer is low and the fluorescent intensity obtained from the resulting solution is relatively low thereby making the material relatively insensitive for the detection of small cracks. It is found, however, that halogenated solvents mixed with the trifluorochloroethylene greatly increase the solubility of the dye and provide a highly satisfactory dye penetrant solution capable of penetrating small cracks and resisting wash-out. The solvent employed with the trifluorochloroethylene polymer is preferably completely miscible with the polymer and is preferably sufficiently halogenated to be completely non-flammable and non-reactive with liquid oxygen. In order to provide a dye penetrant which remains safe it is preferred to employ a solvent having a relatively low evaporation rate. It is found that materials having an evaporation rate less than methylene chloride are preferred in the practice of this invention so that rapid evaporation at approximately room temperature does not occur. It is found, for example, that trichlorofluoromethane, trichlorotrifluoroethane, methylene chloride, chloroform, trichloroethylene, methyl chloroform, and carbon tetrachloride are suitable solvents to employ with trifluorochloroethylene polymer to prepare a dye penetrant solution.

Even with a choice of solvents as enumerated above some slow evaporation of solvent occurs in use of a dye penetrant material. It is found, however, that where dye is present in the solution in a quantity having a ratio not greater than 1:20 by weight relative to the trifluorochloroethylene polymer, that even after evaporation of the solvent thereby reducing the solubility of dye in the vehicle, no reaction of the residual penetrant with liquid oxygen occurs. In many trifluorochloroethylene polymers the solubility limit of the preferred dye is low so that the ratio of 1:20 of dye to trifluorochloroethylene polymer results in some of the dye coming out of solution or remaining in a super-saturated solution. At concentrations not greater than 1:20 the dye is sufficiently dispersed in the trifluorochloroethylene polymer, either as discrete widely separated particles in suspension or in a super-saturated condition, that no self-sustaining reaction occurs with liquid oxygen. Thus even after evaporation of the solvents which are employed to increase the solubility of the dye, the trifluorochloroethylene polymer continues to mask the reactivity of the dye and prevent reaction with liquid oxygen.

It is preferred in the practice of this invention to employ trifluorochloroethylene polymer in a proportion from about 5 to 100 percent by weight and to employ from 0 to 95 percent by weight of solvent with the polymer to form a vehicle for dye. It is preferred that the total dye be less than about 2 percent by weight since this approaches the saturation of dye in the solution and it is particularly preferred to employ about one percent by weight of dye for optimum sensitivity in detecting cracks. In any event the quantity of dye is preferred to have a ratio of not greater than 1:20 relative to the trifluorochloroethylene polymer. If less than 5 percent of trifluorochloroethylene polymer is employed in the dye penetrant solution and the ratio of dye to polymer is less than 1:20, insufficient dye is present to provide an acceptable sensitivity in the penetrant solution.

The concentration of trifluorochloroethylene polymer can range upward to 100 percent of the vehicle for the dye or about 99 percent by weight of the dye penetrant solution. These higher concentrations of trifluorochloroethylene polymer with small quantities of halogenated solvent are useful with low molecular weight polymers having a low degree of polymerization where the viscosity is relatively low and good penetration into small cracks is readily obtained. With higher molecular weight polymers having a high degree of polymerization it is preferred to employ a solvent not only to increase dye solubility but also to lower the viscosity of the solution to a sufficiently low value to permit good penetration into very small cracks. By selection of trifluorochloroethylene polymers and solvents in the ranges specified, a large range of viscosity is available for formulating penetrant compositions for any selected inspection technique.

It is particularly preferred in the practice of this invention to employ a dye penetrant solution comprising 50 percent by weight of trifluorochloroethylene polymer having an average degree of polymerization of approximately six, 49 percent by weight of a solvent selected from the class consisting of halogenated hydrocarbons having an evaporation rate not greater than methylene chloride and one percent by weight of dye. It is preferred that the solvent comprise 40 percent by weight of trichloroethylene, 30 percent by weight of trichlorotrifluoroethane and 30 percent by weight of methylene chloride. It is found that such a solvent provides a non-toxic, non-flammable solution having a relatively low evaporation rate and is relatively economical. Methylene chloride is included since it serves to enhance the brilliance of fluoroescence, but is limited in quantity since it is relatively more volatile than the other materials.

It is particularly preferred that the dye employed comprise 80 percent by weight of Fluorol 7–GA and 20 percent by weight of Calcofluor White RW thereby yielding 0.8 and 0.2 percent respectively of these dyes in a dye penetrant solution. This concentration gives a good color of fluorescence and a bright image yielding optimum sensitivity for detection of small cracks.

A surface to be inspected for the presence of cracks is coated with a dye penetrant solution of the type above described. This solution is drawn in to any cracks that open onto the surface by capillary action and in order to permit penetration into cracks of all sizes, the penetrant is left undisturbed on the surface for a period of time. It is found in the practice of this invention that a dwell time on the surface of about ten minutes is preferred. This is sufficient to permit penetration of solution into fine thermal cracks and the like. Coating of solution may be by means of brushing, dipping, or spraying; and spraying with a pump or aerosol can, and not an air atomizer, is preferred.

After a penetrant is applied to a surface to be inspected and permitted to dwell thereon for a sufficient time for the penetrant to enter any surface cracks that may be present, the excess penetrant is removed. Removal can be by means of organic solvents such as acetone, methyl ethyl ketone, methyl chloroform or halogenated solvents of the type above described. The best solvents found are trichloroethylene and trichloroethane. With care, steam cleaning can be used to remove the penetrant. It is more economical and presents fewer material handling problems to employ water as the removal agent. The trifluorochloroethylene polymers employed in the practice of this invention are insoluble in water and an emulsifier is employed to make the system water washable. An emulsifier can be incorporated in the wash water, however, this requires a substantial quantity of emulsifier and washing efficiency is relatively low. An emulsifier can be incorporated in the trifluorochloroethylene polymer to make the solution water washable. When in solution, it is preferred that the emulsifier be present in the range of from two to ten percent for good water washability. Lower concentrations may not give adequate cleaning and might just as well be omitted, and higher concentrations may interfere with action as a penetrant because of the large molecular size of typical emulsifiers.

It is preferred to employ a technique known to those skilled in the art as post emulsification. In this technique the surface having the penetrant thereon is coated with an emulsifier, or a solution having a very high concentration of emulsifier. The emulsifier remains on the surface for from five to ten minutes to thoroughly mix with the penetrant on the surface. The surface can then be flushed with water at subtsantial pressure to remove the penetrant and emulsifier.

Emulsifiers useful in the practice of this invention are soluble in the trifluorochloroethylene polymers and emulsify them in water, and include, for example, nonionic emulsifiers such as polyethoxylated phenol. A suitable polyethoxylated phenol has been found to be one having a structure

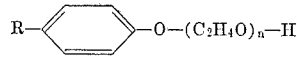

where $n$ is in the range of from five to ten and R is an isooctyl or nonyl group. Other emulsifiers such as complex organic phosphate esters can be used. Such materials are available under the trademarks Igepal and GAFAC respectively from General Aniline and Film Corp., New York, N.Y. Amine salts of dodecyl benzene sulfonic acid and ammonium fatty acid soaps that are soluble in the trifluorochloroethylene polymers can also be used. A good class of emulsifiers includes the mahogany sulfonates produced in the petroleum industry. The emulsifiers can be applied directly to the penetrant employed in the practice of this invention or can be diluted with petroleum solvent or halogenated hydrocarbon solvent up to about 50 percent solvent, for application to the surface.

Cleaning of the surface when a penetrant having fluorescent dye is employed, is preferably under ultraviolet illumination so that any residual fluorescence can be seen and removed. It is found that with solvent removal and with water washing, there is no substantial bleeding of penetrant from cracks and good sensitivity is obtained with diverse removal techniques.

After excess penetrant is removed, visual indications of cracks are developed by coating the surface of the part with a material having a high amount of surface area. A preferred material for developing indications of cracks is finely powdered talc or a mixture of powdered talc and calcium carbonate or calcium hydrate. These materials are insensitive to reaction with liquid oxygen and provide a good indication of cracks. The talc is put on to the surface by dusting or dipping the workpiece in the powder or as a suspension in a carrier liquid. For a liquid developer, from 5 to 15 percent of powder is suspended in water, isopropyl or ethyl alcohol, perchloroethylene, trichloroethylene or the like and the mixture sprayed or brushed on the surface. The high surface area of the powder on the surface of the part draws penetrant from any cracks extending to the surface and the penetrant solution spreads away from the crack in the powdered material. Thus the apparent width of the crack is increased and the ability of an operator to detect cracks is enhanced. After the developer is left on the surface a few minutes, indications of cracks are fully developed and are detected by visual examination. If colored dye is employed, a high degree of contrast exists with the white talc background, and if fluorescent dye is employed, illumination under ultraviolet light gives high contrast with the dark background of non-fluorescing developer. Indications of cracks can also be developed by coating the surface with polyvinyl chloride or the like to form a continuous film. After dye soaks into the polyvinyl chloride, the coating can be peeled off to retain a permanent record of the indications.

If any cracks are found in a surface, it is a usual practice to remove the faulty material and repair the area. Thus, for example, in an aluminum weld, any cracked area is machined away using a rotary file, hand file or milling cutter. The area is then re-welded to provide sound material and is preferably re-inspected to assure freedom from cracks. In reworking parts, it is desirable to have a material in any existing cracks that will not react with the material forming the part and that if possible will assist in the machining operation. It is therefore desirable in many applications, particularly on aluminum alloys, to employ an extreme pressure agent in the dye penetrant solution. The extreme pressure agent prevents breakdown of the penetrant liquid under the high shear forces of machining and thereby assists the machining operation.

It is preferred in the practice of this invention to employ chlorinated diphenyl in the trifluorochloroethylene polymer solution as an extreme pressure agent. The chlorinated diphenyl preferably has a chlorine content in the range of from 30 to 70 percent by weight of chlorine. A particularly suitable material has been found to be a chlorinated diphenyl having 54 percent by weight of chlorine and available under the trademark Aroclor 1254 from Monsanto Chemical Co., St. Louis, Mo. Other extreme pressure agents that are useful in the practice of this invention include tris-dichloropropyl phosphate, tris-B chloroethyl phosphate, dibutyl chloromethyl phosphonate, and dipropyl chloromethyl phosphonate. Up to about 15 percent by weight of extreme pressure agent can be employed in a dye penetrant solution without harmful effect. Higher concentrations of some agents may make the penetrant sensitive to reaction with liquid oxygen.

Other materials are useful in dye penetrant solutions based on trifluorochloroethylene polymers such as, for example, octyl diphenyl phosphate which serves to increase the solubility of dye in the polymer and does not evaporate after applying to a surface to be inspected. Up to about 15 percent by weight of octyl diphenyl phosphate can be employed in a penetrant based on trifluorochloroethylene polymer. Octyl diphenyl phosphate is a stable material but demonstrates an occasional reaction with liquid oxygen when impacted with 72 foot pounds and concentrations less than about 15 percent by weight are preferred so that any tendency to react is suppressed by the trifluorochloroethylene polymer in a manner similar to suppression of reaction of dye in the solution. Similarly up to about ten percent by weight of dioctyl phthalate can be added to the trifluorochloroethylene polymer base to reduce the viscosity of the dye penetrant solution with a non-volatile material. Surfactants and wetting agents can be added to the described dye penetrant, however, it is found that there is good wetting of surfaces and there is no need for additives of this nature for most inspection techniques.

The preparation and application of material prepared in the practice of this invention are illustrated in the following non-limiting examples.

EXAMPLE 1

A dye penetrant solution was formulated and tested according to the principles of this invention. The solution was made up by mixing 4263 grams of methylene chloride, 4263 grams trichlorotrifluoroethane, and 5702 grams trichloroethylene. This makes about 2½ gallons of solvent mixture. To this mixture was added 58 grams of Calcofluor White RW and 232 grams Fluorol 7–GA and the material was stirred until substantially all of the dyes were in solution. The resulting material was filtered through a loose fiberglass cloth in order to remove any solid contaminants or undissolved crystals of dye. To this dye containing solution was added 14,518 grams of KEL-F 10, a trifluorochloroethylene polymer having a degree of polymerization of 6 and the entire mixture was stirred until completely mixed. This produces approximately five gallons of dye penetrant solution. After mixing, the dye penetrant solution was again filtered to remove any crystals of dye that may have formed upon addition of the KEL-F 10. It is desirable in the mixing of the dye penetrant solution to dissolve the dyes in the halogenated solvents before addition of any trifluorochloroethylene polymer in order to produce a solution that is substantially saturated with dyes. It is found to be difficult to obtain complete solution of a substantial quantity of these dyes in the trifluorochloroethylene polymer having a degree of polymerization of six.

The ability of the dye penetrant solution to detect small cracks was evaluated according to the requirements of Military Specification MIL–I–25135. Test panels of 2014–T3 or 2024–T3 aluminum alloy were prepared according to this specification. Panels 3″ x 2″ were cut from 5/16″ thick aluminum with the 3″ dimension parallel to the direction of milling of the sheet. The panels were heated non-uniformly and water quenched to produce thermal cracks. This was accomplished by supporting the panel horizontally in a frame and impinging the flame of a torch in the center of the lower side of the panel without movement in any direction. A 950 to 980° F. temperature indicating crayon was applied to an area about the size of a penny on the top side in the center of the panel. The heat of the torch was adjusted so that the panel was heated approximately four minutes before the crayon melted after which the panel was immediately quenched in cold water. This operation was then repeated on the opposite side of the panel and a groove approximately 1/16″ wide x 1/16″ deep was cut in the 2″ direction across the center of the heat affected zone on both sides of the panel to form two similar specimens and prevent cross contamination. Before using, the panels were cleaned by vigorous scrubbing with a bristle brush and trichloroethylene followed by a vapor degreasing.

A dye penetrant having a standard ability to penetrate cracks and provide a standard intensity of fluorescence as set forth in Military Specification MIL–I–25135 was applied to one-half of the aluminum panel. The other half of the panel as bounded by the panel edges and the 1/16″ groove was coated with the dye penetrant according to this invention as above described. These materials were permitted to remain on the surface for approximately ten minutes to permit full penetration into the surface thermal cracks. Both sides of the test panel were then scrubbed with methyl chloroform for a one minute period. Other panels were coated with polyethoxylated phenol after penetration and washed with a spray of high pressure water to emulsify the penetrant solution. After the surface was dried in air it was examined under ultraviolet illumination to assure the absence of residual fluorescence. The ultraviolet had a characteristic wave length of about 3650 angstrom units and an intensity of from 100 to 150 foot candles. The aluminum panels were then covered with a thin layer of developer to produce an indication of any creacks in the panel. The preferred developer is a mixture of from 5 to 15 percent of powdered talc suspended in trichloroethylene sprayed on the surface. Panels were also developed by the use of dry powdered talc applied to the surface.

After development the samples were visually compared to determine the ability of the above described dye penetrant to detect cracks as compared with the ability of the standard penetrant solution to detect cracks in the two halves of the same aluminum panel. The density of cracks detected and fluorescent brightness were noted. It was found that the above described dye penetrant is at least as good as the standard dye penetrant in detecting surface thermal cracks in standard aluminum panels. Cracks as shallow as 0.030 inch are readily detected by the described technique.

In addition the dye penetrant solution described above has been employed for the detection of very fine thermal cracks in a specimen of weld in which stainless steel was welded to titanium. Such a specimen has a large number of thermal cracks which the above described penetrant satisfactorily revealed.

The penetrant solution above described was tested for compatibility with liquid oxygen. This test was performed by contacting a test material with liquid oxygen and impacting the material and the liquid oxygen with an energy of 72 foot pounds. It is considered that any material showing no reaction under these conditions is acceptable for use on surfaces that may be wetted by liquid oxygen. Any material yielding an audible explosion, a visible flash in a darkened room, discoloration or charring is not considered safe for use in contact with liquid oxygen.

The apparatus employed for impact testing comprises a rigid base into which an aluminum cup is inserted. A hardened stainless steel striker pin having a diameter of one-half inch is arranged so as to be adjacent the inside bottom of the aluminum cup. A plummet weighing 20 pounds is permitted to drop in a free fall for 43.3 inches and strike the striker pin thereby impacting the striker pin against the inside of the aluminum cup. A sample of the material to be tested is placed in the bottom of the aluminum cup with a thickness of 0.050 inch and the cup is filled with liquid oxygen prior to impact. It is found in employing such a test that no reactions between the above described penetrant and liquid oxygen have occurred despite testing of several hundred individual samples in thicknesses ranging from 0.002 to 0.050 inch. Many samples have been tested at an impact load of 81 foot pounds, the capacity of the available machine, rather than the prescribed 72 foot pounds and no reactions have been noted. Samples of penetrant solution 0.010 inch thick were heated at 400° F. for 3½ hours to completely remove any solvent, and impact tests with liquid oxygen gave no reactions. Similarly samples were kept at room temperature 1½ hours and at 340° F. for 45 minutes to evaporate all solvent. These samples also gave no reaction with liquid oxygen in the described impact test. It is therefore established that the dye penetrant described above is acceptable for use on surfaces that may be wetted by liquid oxygen.

Tests were made of surfaces after inspection to determine suitability for adhesive bonding and conversion coating. Both procedures were satisfactory indicating that the surfaces are not harmed by the described penetrant.

EXAMPLE 2

A dye penetrant solution was compounded by dissolving .8 percent by weight of Fluorol 7–GA and .2 percent by weight of Calcofluor White RW in 49 percent by weight of trichloroethylene. After the dyes were dissolved 50 percent by weight of KEL-F 10 was added to the solution and stirred until thoroughly mixed. After the solution had stood for 24 hours it was filtered to remove any residual undissolved dye crystals or other contamination. This dye penetrant solution was subjected to a large number of impact tests according to the procedure described in Example 1 and no reactions with liquid oxygen have been observed. Similarly this dye penetrant solution was tested on standard aluminum panels prepared as described in Example 1 and the material was found to be a satisfactory dye penetrant having sufficient sensitivity to detect fine thermal cracks.

A dye penetrant solution was formulated having 49.8 percent by weight of KEL-F 10, 50 percent by weight of trichloroethylene, .05 percent by weight of Calcofluor White RW and .15 percent by weight of Fluorol 7–GA in the same manner as described in Example 1. A dye penetrant solution having 49.8 percent by weight of KEL-F 10, 15 percent by weight of trichlorotrifluoroethane, 20 percent by weight of trichloroethylene, 15 percent by weight of methylene chloride, .05 percent by weight of Calcofluor White RW and .15 percent by weight of Fluorol 7–GA was formulated as described in Example 1. A dye penetrant solution was made up by mixing 20 grams KEL-F 10, 12 grams of trichlorotrifluoroethane, 12 grams of methylene chloride, 16 grams of trichloroethylene, .3 gram Fluorol 7–GA and .1 gram Calcofluor White RW in the same manner as described in Example 1. These materials were all subjected to impact testing as described in Example 1 with an impact energy of 81 foot pounds on a sample thickness of 0.005 inch and no reactions were obtained with any of these solutions. Similarly these solutions were tested on standard aluminum panels as described in Example 1 and found to be satisfactory as dye penetrant material.

EXAMPLE 3

Dye penetrant solutions were formulated in the same manner as described in Example 1 having compositions as set forth in Table I. KEL-F–3 as set forth in Table I is a trifluorochloroethylene polymer having a degree of polymerization of 4. The safety solvent set forth in Table I comprises a mixture of 30 percent by weight of trichlorotrifluoroethane, 30 percent by weight of methylene chloride and 40 percent by weight of trichloroethylene. This safety solvent is a convenient non-flammable non-toxic mixture employed in formulating dye penetrant solutions according to the practice of this invention.

TABLE I.—COMPOSITION OF DYE PENETRANTS

| KEL-F–3, percent by weight | Safety solvent, percent by weight | Trichloroethylene, percent by weight | Dye |
|---|---|---|---|
| 50 | | 50 | Saturated with Calcofluor White RW and Fluorol 7–GA. |
| 33⅓ | | 66⅔ | Do. |
| 99.6 | | | .3% Fluorol 7–GA. .1% Calcofluor White RW. |
| 50 | 48.5 | | 1.5% Oil Red CY. |
| 79.5 | 20 | | 0.5% Oil Red CY. |
| 50 | | 50 | Saturated with Oil Red O. |

Dye penetrant solutions as set forth in Table I show no reaction with liquid oxygen when subjected to impact sensitivity tests as set forth in Example 1. Dye penetrant solutions as set forth in Table I are sensitive for the detection of fine thermal cracks in aluminum test panels in the manner set forth in Example 1.

A dye penetrant solution comprising 99.6 percent by weight of KEL-F–3, 0.3 percent Fluorol 7–GA and 0.1 percent Calcofluor White RW was mixed with trichloroethylene in proportions 1:1, 2:1 and 3:1 of trichloroethylene to KEL-F–3 solution. These three solutions are all satisfactory as dye penetrant solutions and showed no reactions with liquid oxygen when tested in the manner set forth in Example 1.

EXAMPLE 4

A dye penetrant solution having 49.8 percent by weight of KEL-F–1, 49 percent by weight of KEL-F–3, 0.1 percent Calcofluor White RW and 0.3 percent Fluorol 7–GA was formulated in the same manner as set forth in Example 1. KEL-F–1 and KEL-F–3 are trifluorochloroethylene polymers having a degree of polymerization of two and four respectively. The viscosity of the resulting solution is about 10 centistokes and demonstrates high sensitivity for detection of thermal cracks in aluminum panels in the manner set forth in Example 1. No reactions with liquid oxygen have been observed in a large number of tests conducted as described in Example 1.

EXAMPLE 5

A dye penetrant solution was formulated in the manner set forth in Example 1 having 20.3 grams of Fluorolube GR–362, 101.5 grams trichloroethylene, .15 gram Calcofluor White RW and .45 gram Fluorol 7–GA. A dye penetrant solution was made up in the same manner as set forth in Example 1 comprising 50 percent by weight Fluorolube T–80, 49 percent by weight of 1,1,1-trichloroethane, .2 percent by weight Calcofluor White RW and .8 percent by weight Fluorol 7–GA. Fluorolube GR–362 is a trifluorochloroethylene polymer having an average degree of polymerization of from about eight to ten. Fluorolube T–80 is a trifluorochloroethylene polymer having an average molecular weight of about 880. These polymers have about 80 percent by weight of halogen.

These dye penetrant solutions are sensitive for detection of thermal cracks in aluminum panels in the manner set forth in Example 1 and no reactions have been observed in impact testing in contact with liquid oxygen in the manner set forth in Example 1. No reactions between liquid oxygen and the latter dye penetrant were noted after deliberate evaporation of the 1,1,1-trichloroethane from the solution.

EXAMPLE 6

Dye penetrant solutions were formulated in the same manner as set forth in Example 1 employing 40 percent by weight of KEL-F 40, 0.2 percent by weight of Calcofluor White RW, .8 percent by weight Fluorol 7–GA and 59 percent by weight of solvent. One such solution employed trichloroethylene as the solvent and another solution employed the safety solvent described in Example 3 as the solvent. KEL-F 40 is a trifluorochloroethylene polymer having a degree of polymerization of eight. These solutions are both sensitive for dye penetrant detection of cracks in standard aluminum panels as set forth in Example 1 and are insensitive to reaction with liquid oxygen when tested in the manner set forth in Example 1.

EXAMPLE 7

Dye penetrant solutions were formulated in the manner set forth in Example 1 having compositions as set forth in Table II. The dye penetrant solutions set forth in Table II included selected additives which serve as extreme pressure agents to assist in any necessary machining operations that may be required for the removal of cracks found by dye penetrant inspection. Similarly chlorinated diphenyl is added to enhance the solubility of dye in the solution. The chlorinated diphenyl employed in this example has about 54 percent by weight of chlorine. The dyes employed comprised Calcofluor White RW and Fluorol 7-GA in the proportion 4:1 by weight.

TABLE II.—COMPOSITION OF DYE PENETRANTS

| KEL-F 10, percent by weight | Safety solvent, percent by weight | Dyes total, percent by weight | Other, percent by weight |
|---|---|---|---|
| 45 | 49 | 1 | 5 octyl diphenyl phosphate. |
| 48 | 46.5 | 2 | 3.5 octyl diphenyl phosphate. |
| 40 | 48 | 2 | 10 octyl diphenyl phosphate. |
| 40 | 49 | 1 | 5 octyl diphenyl phosphate, 5 chlorinated diphenyl. |

Dye penetrant solutions as set forth in Table II are sensitive for detection of small thermal cracks in standard aluminum panels as set forth in Example 1. Dye penetrant solutions as set forth in Table II show no reaction with liquid oxygen when tested in the manner set forth in Example 1.

It is to be understood that the above described examples are merely illustrative of the application of the principles of this invention. Those skilled in the art may readily devise other variations that will embody the principles of this invention. It is therefore to be understood that within the scope of the appended claim the invention may be practiced otherwise than as specifically described.

What is claimed is:

1. A dye penetrant solution comprising:
   50 percent by weight of $R—(CF_2—CFCl)_6—R$ where R is selected from the group consisting of hydrogen and halogens;
   14.7 percent by weight of trifluorotrichloroethane;
   14.7 percent by weight of methylene chloride;
   19.6 percent by weight of trichloroethylene;
   0.8 percent by weight of fluorescent naphthalimide type fluorescent dye; and
   0.2 percent by weight of coumarin type fluorescent dye.

References Cited

UNITED STATES PATENTS

| 2,617,269 | 11/1952 | Smith-Johannsen | 117—132CF |
| 2,915,416 | 12/1959 | West | 117—138.8 |
| 3,019,115 | 1/1962 | Kaufman et al. | 117—138.8 |
| 3,418,078 | 12/1968 | Mlot-Fijalkowski | 250—71T |

TOBIAS E. LEVOW, Primary Examiner

R. D. EDMONDS, Assistant Examiner

U.S. Cl. X.R.

23—230; 73—104; 250—71; 252—408